P. T. BURK.
MOTOR VEHICLE.
APPLICATION FILED NOV. 25, 1914.
1,242,650.
Patented Oct. 9, 1917.
2 SHEETS—SHEET 1.
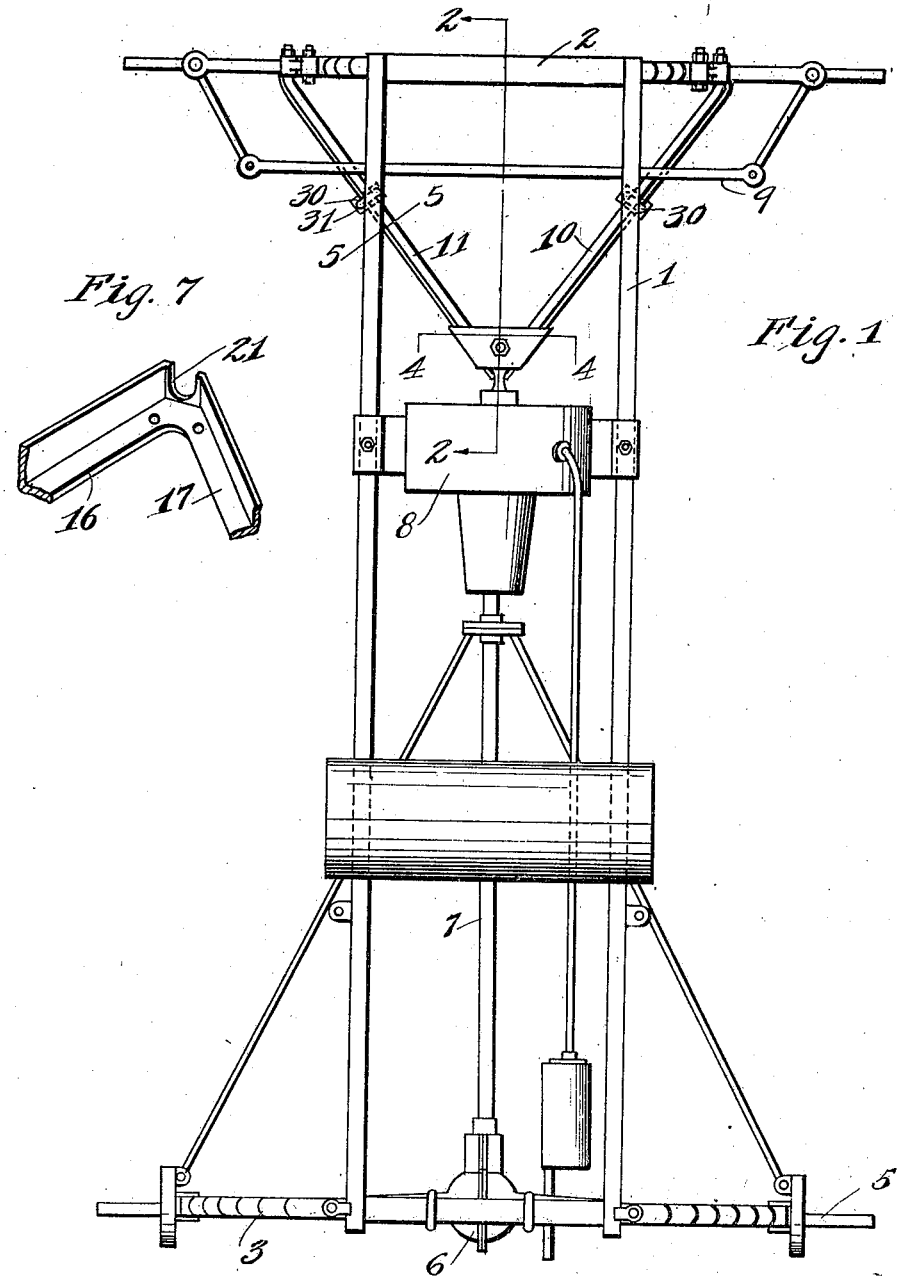
Witnesses
Sidney K. Negrotto
M. L. Newcomb
Inventor
Patrick T. Burk
By Homer A. Phillips
Attorney

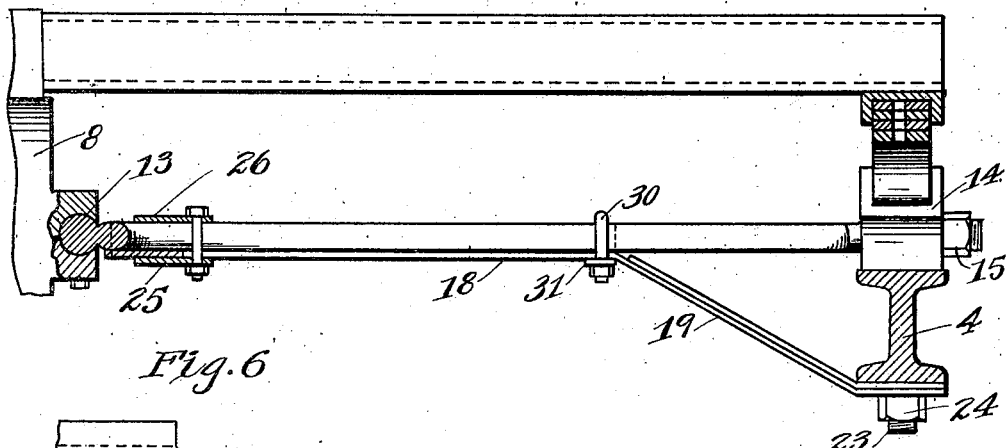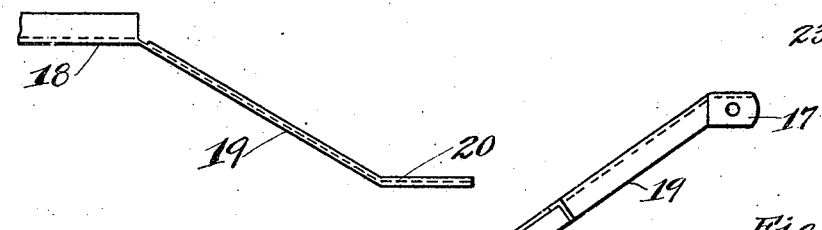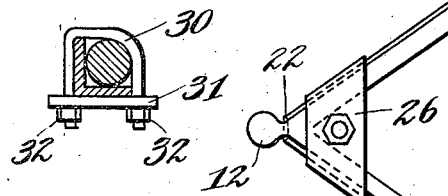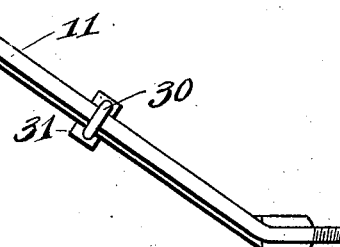

UNITED STATES PATENT OFFICE.

PATRICK TOMAS BURK, OF MILFORD, IOWA.

MOTOR-VEHICLE.

1,242,650.　　　　Specification of Letters Patent.　　　Patented Oct. 9, 1917.

Application filed May 25, 1914. Serial No. 840,827.

*To all whom it may concern:*

Be it known that I, PATRICK T. BURK, a citizen of the United States of America, residing at Milford, in the county of Dickinson and State of Iowa, have invented certain new and useful Improvements in Motor-Vehicles, of which the following is a specification.

The present invention relates to improvements in motor vehicles, and especially to the front radius rods of the under-frame or chassis of automobiles of a certain well known type.

The primary object of the invention is to provide a reinforcing member in connection with the front radius rods which will not only protect the radius brace or rods themselves, but which are so arranged in connection with the front axle, as to absorb the shocks or vibrations to which the axle is submitted, and in this manner assure easier riding, and easier guiding of the car. The attachment which forms the subject matter of the invention may be fixed to the cars now in use with quickness and facility, and when desired, the attachment may be removed with equal facility.

The invention consists in certain novel combinations and arrangements of parts with the radius rods and front axle, as will be more fully pointed out hereinafter and set forth in the claim.

In the accompanying drawings I have illustrated one complete example of the physical embodiment of my invention constructed according to the best mode I have so far devised for the practical application of the principles of the invention.

Figure 1 is a plan view of a motor vehicle frame or chassis showing my invention applied thereto.

Fig. 2 is a view taken at line 2—2, Fig. 1, showing the front axle and spring in section, and showing also the ball and socket connection between the radius rod and a portion of the engine casing.

Fig. 3 is a plan view of the radius rods detached from the frame and having my reinforcing member applied thereto.

Fig. 4 is a transverse section on line 4—4, Fig. 1.

Fig. 5 is a transverse section on line 5—5, Fig. 4.

Fig. 6 is detail fragmentary view showing a portion of one of the angle steel braces which form the forks of the brace.

Fig. 7 is a fragmentary perspective view of the reinforcing brace.

In the preferred embodiment of my invention, as illustrated in the drawings, I have shown in Fig. 1 the under frame or chassis of a standard automobile, having the well known parts including the rectangular vehicle frame 1, which is supported upon the front spring 2 and the rear spring 3. The front axle 4, rear axle 5, the gear casing 6, the sleeve 7 for the driving shaft, the engine casing 8, and the steering gear 9, are all of well known and standard form.

The present attachment is particularly applied to the front radius rods 10 and 11 which are forks of the single piece or V-shaped rod formed with the ball 12 which is usually seated in a socket 13, the walls of which are integral with the engine casing 8. The front ends of the forked radius rod are threaded and passed through the plate 14 secured on the front axle 4, and the nuts 15 clamp the parts as usual.

The new bracing element which is the subject matter of my invention, is also a V-shaped or forked member preferably made of angle steel. Each fork of the V-shaped member, as 16 and 17, is provided with a horizontal portion 18 and inclined portion 19, and a horizontal end piece 20. In Fig. 7 it will be seen that the angle steel pieces converge, and at their bend or apex a curved notch or seat 21 is formed for the neck 22 of the radius rod or ball 12. The horizontal portions 18 of the brace member, fit up under and at the side of the radius rods, and support these rods, while the horizontal end pieces 20 of the forked member are rigidly secured to the front axle by means of bolts 23 and nuts 24.

At the point of the connection between the integral radius rod and the integral forked brace, these parts are secured together by a base plate 25, and a cap plate 26. The cap plate is formed with overhanging flanges 27—27 which extend down over the upright flanges of the members 16 and 17, and the bolt 28 is passed through the cap plate 26 and the base plate 25 which are perforated for the purpose, and the nut 29 clamps the base plate and cap plate together. In this manner a rigid and secure joint between the radius rods and the reinforcing brace member is provided.

At the point of junction between the incline portion 19 and the horizontal portion 18 of the brace member a U-shaped bolt 30 is provided to couple and securely hold the radius rod and brace. The ends of this bolt are passed through the plate 31 and the nuts 32 serve to clamp the rod and angle iron securely together, as shown in Fig. 5.

From the above description it will be seen that I have provided a reinforcing brace which conforms in shape to the outline of the radius rods of the frame of the motor vehicle, and the reinforcing brace is attached at the under side of the front axle. This attachment insures a rigid connection between the front axle and radius rod, and it also prevents undue movement of the front axle because of its point of application at the under side of the axle.

When equipped with my attachment, the safety of the car against accident from breaking of parts or wrenching of parts due to shocks to the car from encountering rough roads or ditches, is avoided and practically eliminates the breaking or bending of the radius rod as is a frequent occurrence, but when equipped with my reinforcing attachment the possibility of such occurrences is practically *nil*. The presence of my attachment, of course, does not interfere with the proper rocking movement or relative movement between the car and the front axle, as the brace in no way interferes with the designed movement of any of the parts of the vehicle.

Having thus fully described my invention, what I claim as new and desire to secure by Letters Patent, is:—

In a motor vehicle the combination with its frame including the V-shaped radius rods and front axle, of a V-shaped integral brace formed of angle steel, said brace having inclined portions attached to the front axle, and horizontal portions upon which the radius rods are seated, a base plate, a cap plate, and a bolt clamping the rods and brace together, and a U-shaped bolt at the junction of the horizontal and inclined portions clamping the angle steel and rod together.

In testimony whereof I affix my signature in presence of two witnesses.

PATRICK TOMAS BURK.

Witnesses:
  LEONARD D. DAILY,
  FRANK C. WILLIAMS.